April 21, 1936.  T. H. JACOB  2,038,293
WHEEL HUB
Filed Oct. 29, 1934
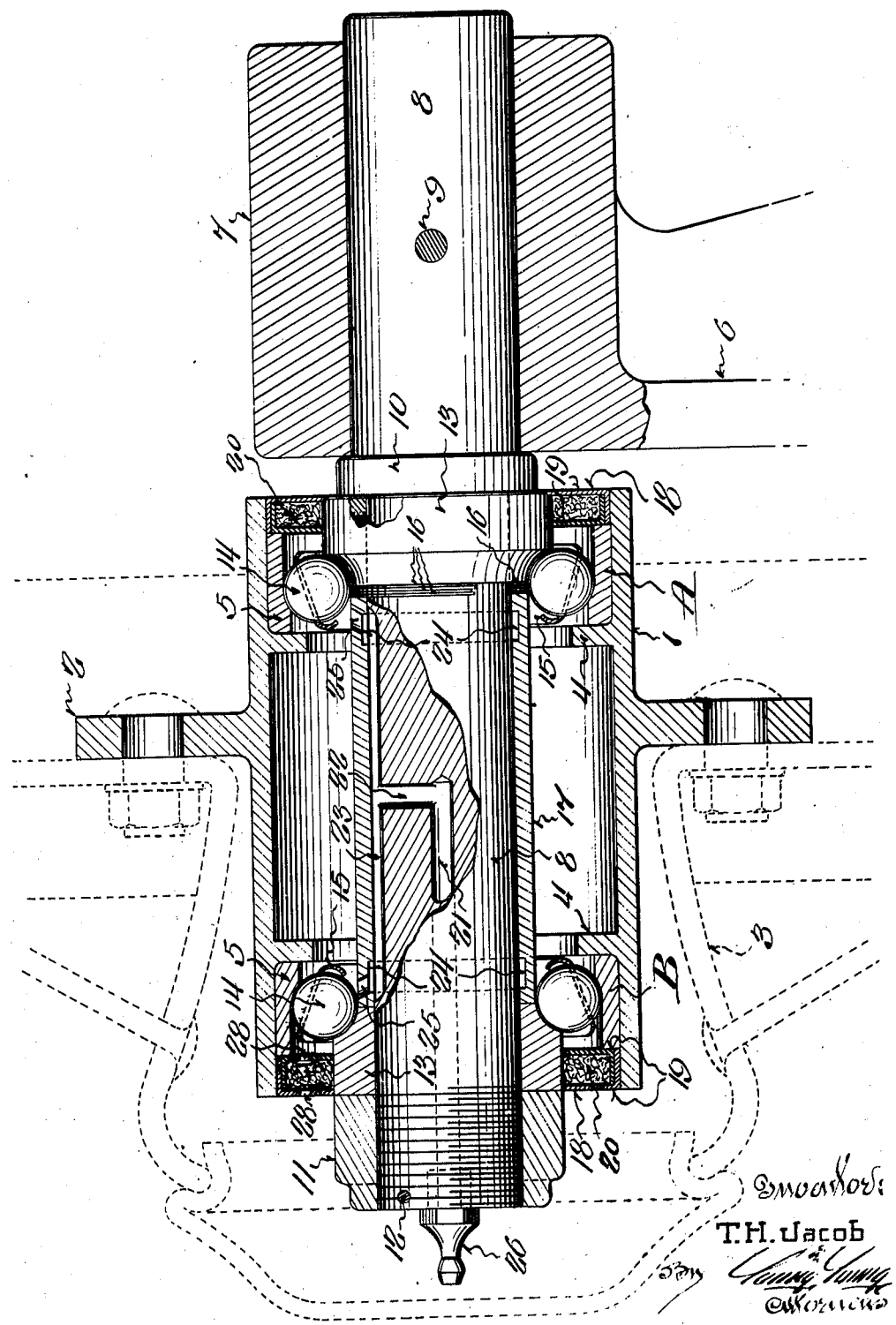
Inventor:
T. H. Jacob Patented Apr. 21, 1936

2,038,293

UNITED STATES PATENT OFFICE 2,038,293

WHEEL HUB

Thomas H. Jacob, Wausau, Wis.

Application October 29, 1934, Serial No. 750,553

2 Claims. (Cl. 308—187)

This invention pertains to improvements in wheel hubs, and more particularly to hubs for use on spindles of non-driven axles, such as the front axles of motor vehicles, trailer axles, and the like.

Heretofore, in hubs of the foregoing type, it has been customary to provide a large inner cone bearing, and a relatively small outer bearing, to facilitate assembly and removal of the wheel hub from the spindle or axle, and relative adjustment of the bearings is usually accomplished by means of a nut threaded on the ends of the spindle, or by threading the outer cone on the spindle and setting the same with a lock nut.

The use of two sizes of bearings is objectionable for the reason that a larger stock must be carried by the dealer or repair man, and the wear on the bearings is seldom uniform. Furthermore, the type of adjustment required is uncertain, regardless of the skill of the mechanic, with the result that the cones are seldom properly alined to provide precision of contact with the anti-frictional elements whether they be balls or rollers.

It is a primary object of the present invention to overcome the foregoing objections by the provision of a hub having uniform inner and outer cone bearings positively spaced and locked in relative adjusted position.

Incidental to the foregoing, a more specific object of the invention resides in utilizing uniform bearings, the cones of which are positively spaced on the spindle by means of a sleeve and one or more annular shims.

A more detailed object resides in the novel manner of insuring uniform lubrication of both bearings through the end of the spindle.

With the above and other objects in view, which will appear as the description proceeds, the invention resides in the novel construction, combination, and arrangement of parts, substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing, the single view is a longitudinal section through a hub and axle spindle, illustrating one form of the present invention.

For the purpose of explanation, the invention is illustrated and will be described as applied to the spindle carried by a drop axle, such as commonly employed in trailers. However, it is to be understood that the salient feature resides in the mounting of the hub on the spindle, regardless of the type of axle employed. Also, it is to be understood that the invention is not to be limited to ball bearings, but includes any cone type bearing utilizing either balls or rollers.

In that form of the invention illustrated, the numeral 1 designates a cylindrical hub shell provided with an external annular flange 2 intermediate its ends, to which a wheel of any type may be attached, such as the wire wheel 3 indicated in dotted lines. The interior of the hub 1 is provided with spaced inner flanges or projections 4 against which the races 5 abut, it being understood that the races 5 are tightly fitted within the outer ends of the shell to prevent their rotation relative thereto.

The axle 6 terminates in a boss 7, in which the inner end of the spindle 8 is secured in any suitable manner. In the present instance the spindle is forced into the boss to provide a drive fit, and may be further secured against possible rotation or shifting by a transverse pin 9 passing through the boss. Adjacent the outer end of the boss 7 the spindle is provided with an annular flange 10, which abuts the boss, while the outer end of the spindle is threaded for reception of a castellated nut 11, which is locked in adjusted position by a pin or cotter key 12 passing through the offset opening in the end of the spindle.

To facilitate explanation, the inner bearing will be designated generally by the letter "A" and the outer bearing as "B." Each bearing includes the usual cone 13, and the balls 14, which are held in spaced relation by the annular cages 15. When assembled, the cone 13 of the inner bearing A abuts the flange 10, the same being freely fitted on the outer end of the spindle 8.

Adjacent the outer face of the cone 13 of the inner bearing, one or more annular shims 16 are positioned on the spindle, and held in place by a spacing sleeve 17, the outer end of which abuts the inner face of the cone 13 of the bearing B, the cone being held against the sleeve by the nut 11. The ends of the hub are sealed by conventional gaskets 18, each comprising a pair of telescoping cups 19 tightly fitted within the ends of the hub 1 and snugly engaging the cones 13. The cups are packed with hair, felt, or other flocculent material 20, which forms an effective seal sufficient to retain lubricant within the hub.

As heretofore explained, considerable difficulty is encountered in properly lubricating conventional hubs, inasmuch as it is impossible to determine when sufficient lubrication has been forced into the hub to reach both bearings, and when an excessive amount of lubricant is forced into the hub, under the high pressures usually employed, the same will be expelled past the sealing gaskets, which is messy and objectionable.

To overcome the foregoing, novel means have been provided to insure proper lubrication of both bearings, and also indicate to the operator when sufficient lubricant has been forced into the hub. This is accomplished by forming a longitudinal duct 21 in the outer end of the spindle 8, which communicates with a radial passage 22, that in turn connects with a longitudinal groove 23 formed in the outer face of the spindle, and extending substantially the same length as the spacing sleeve 17.

Adjacent its ends the spacing sleeve 17 is provided with inner annular grooves 24 communicating with the longitudinal groove 23, while the spaced openings 25 form communications between the annular grooves 24 and the bearings A and B, respectively. The outer end of the duct 21 may be provided with a conventional nipple or fitting 26 for reception of a high pressure lubricating coupler or gun, such as commonly employed at the present time.

Obviously, as lubricant is forced into the duct 21, the same will enter the groove 23 through the passage 22, from which it enters the annular grooves 24 in the sleeves 17, and regardless of the position of the sleeve 17 on the spindle, the lubricant will pass through the openings 25 and 27 adjacent the bearings A and B, to completely lubricate the same. As further lubricant is forced into the hub, the same will become completely packed. When this is accomplished, any excessive lubricant will be forced through the alined openings 28 formed in the cups 19 of the outer gasket 18, thus indicating to the operator that the hub has been completely lubricated.

Considering now the purpose and advantages of the structure as heretofore described, particular attention is directed to the manner in which the salient features of the invention function in the assembly of the hub on the spindle, and proper adjustment of the bearing cones, which is highly essential to free operation of the hub, and reduction of wear to a minimum.

In the assembling operation the various parts are positioned upon the spindle in their proper relation, this being accomplished in the most convenient manner. It is then determined by the operator whether or not the cones are properly spaced to insure precision in alinement of each bearing. In the event a bind exists, which most likely would occur, inasmuch as the spacing sleeve 17 is purposely formed somewhat shorter than the estimated distance between the bearings, one or more shims are then positioned upon the spindle between the inner end of the sleeve 17 and the cone 13 of the bearing A. The cone 13 of the bearing B is then tightly set up by means of the nut 8, and in the event that there is no bind or play in the hub the proper adjustment has been obtained. Otherwise, additional shims may be added, and in this manner adjustment may be obtained with the greatest accuracy. To further insure this, it is proposed to provide annular shims of different dimensions, and in actual practice it has been found that shims of seven one thousandths, twelve one thousandths, and sixteen one thousandths furnish a very effective combination, in that they permit an adjustment with a precision of two one thousandths of an inch.

When the parts are locked in final adjusted position by means of the nut 11, obviously the adjustment cannot change, and a further advantage results from the fact that the cones 13 are securely held against rotation, thus eliminating wear on the shaft and adjacent parts. It is believed that the advantage of this form of adjustment of the bearings over the conventional method of threading the outer cone on the spindle, and setting the same with a lock nut, will be apparent, in that when the lock nut is turned up tightly against the threaded cone, it has been found that the cone will climb on its threads sufficiently to produce a shifting of several thousandths of an inch.

In additon to the foregoing, the present invention lends itself to a mounting in which uniform bearings are permissible, and, as is well-known, in bearings of the same size the wear is uniform, while in conventional mountings considerable more wear occurs on the larger inner bearing than on the outer bearing.

Lastly, the advantages of the present method of lubricating will be obvious in that proper lubrication of both bearings is insured, and the possibility of excessive lubrication eliminated.

I claim:—

1. A wheel hub for attachment on a fixed spindle comprising, a cylindrical shell, spaced antifrictional cone bearings positioned between said shell and spindle, a spacing sleeve positioned on said spindle between said bearings and provided with openings to admit lubricant to said bearings from said spindle, and sealing gaskets for the ends of said shell, one of said gaskets being provided with a restricted opening through which excess lubricant is discharged.

2. In combination, a shouldered spindle provided with a longitudinal duct extending through its outer end, and communicating with a longitudinal groove formed on the outer surface of the spindle, spaced anti-frictional cone bearings positioned on said spindle, variable spacing means mounted on said spindle between said bearings and including a sleeve positioned over said groove and provided with openings adjacent said bearings, a cylindrical hub shell carried by said bearings, a nut threaded on the outer end of said spindle for engaging the adjacent cone and cooperating spacing means on said spindle in abutting relation and sealing gaskets for the ends of said shell, the outer of said gaskets being provided with a restricted opening through which excess lubricant is discharged.

THOMAS H. JACOB.